United States Patent Office 3,325,020
Patented June 13, 1967

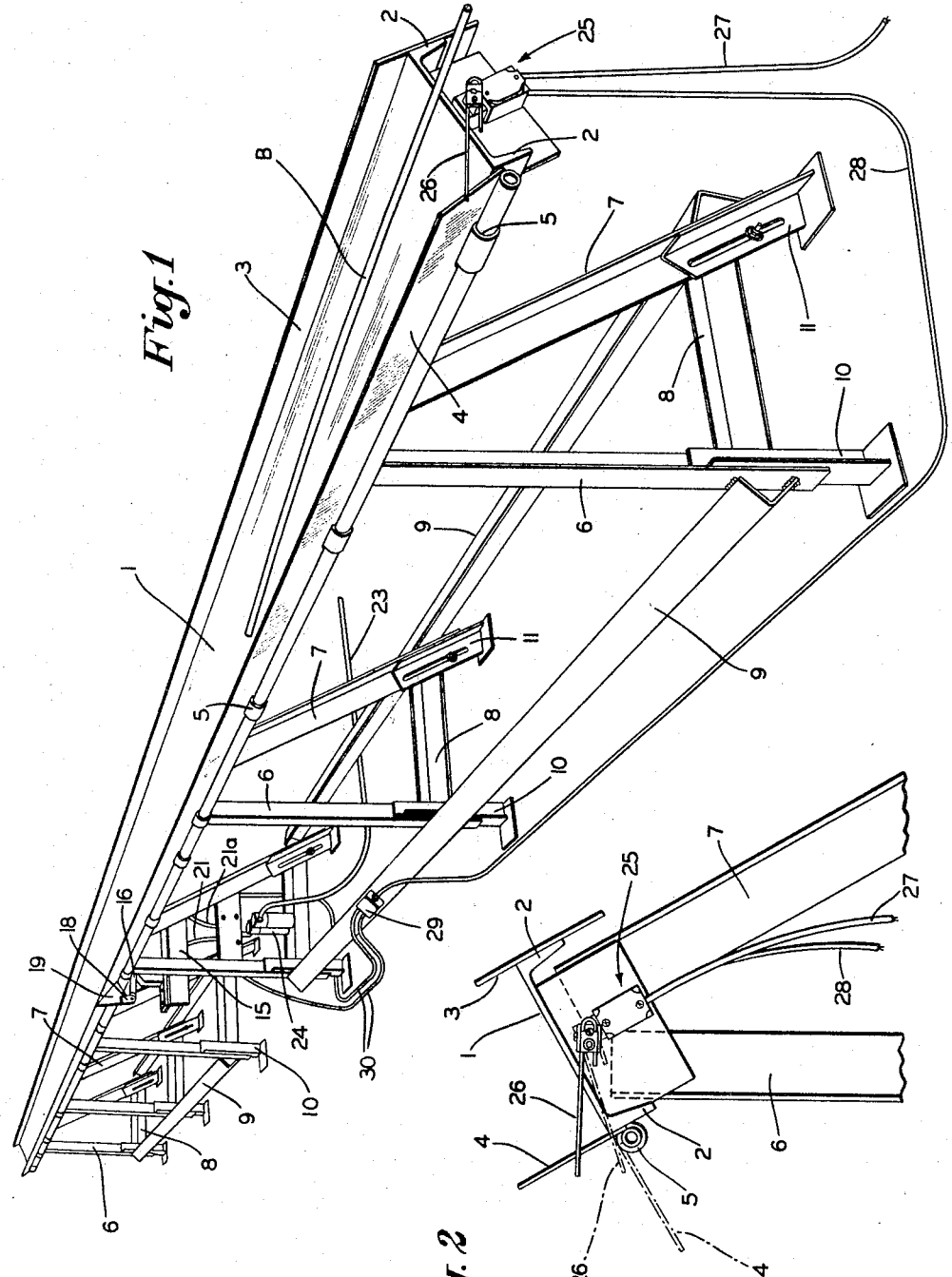

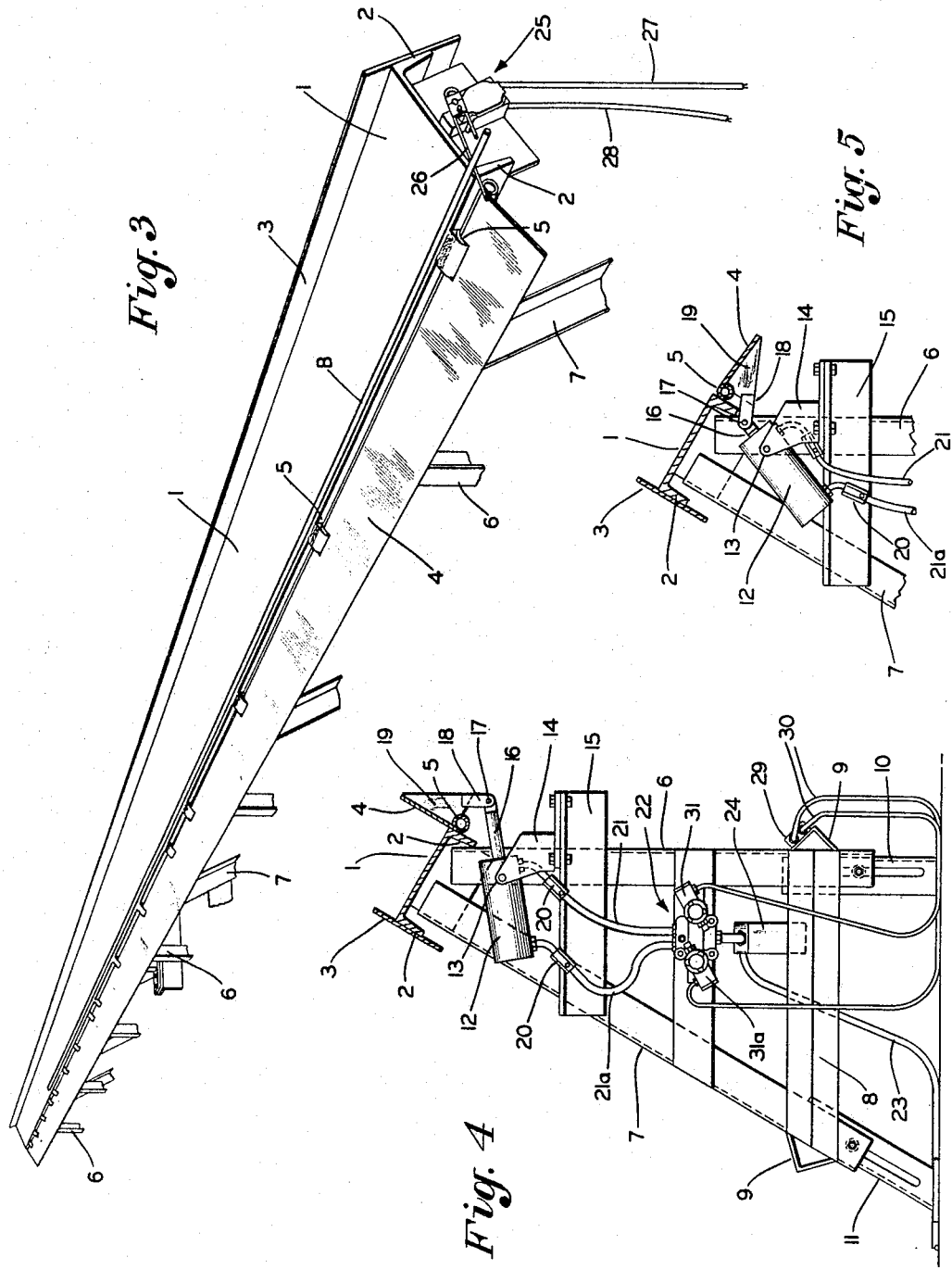

3,325,020
AUTOMATIC TILT TABLE
Russell G. Glass, Canton, Ohio, assignor to Macomber, Incorporated, Canton, Ohio, a corporation of Ohio
Filed July 2, 1965, Ser. No. 469,136
5 Claims. (Cl. 214—1)

The invention relates to automatic tilt tables and more particularly to a run-out table for receiving metal bars, extruded lengths, lumber or other elongated objects longitudinally, and discharging them laterally upon a conveyor, car, truck, storage and handling bolster or the like.

An object of the invention is to provide such a run-out table including a transversely inclined, elongated bed having a hingedly mounted gate at its lower side and a limit switch, actuated by the bars or other elongated objects being handled, controlling means for automatically tilting the gate at a predetermined time to eject the bars or the like laterally from the table.

Another object of the invention is to provide a run-out table of the character referred to in which the hinged gate is operated by a fluid cylinder controlled by means actuated by the limit switch.

A further object of the invention is to provide a run-out table of the character referred to in which the hinged gate is pivotally connected to the piston rod of a double-acting cylinder which is automatically operated to tilt the gate downward to operating position and then upward to normal position by double-solenoid, pilot-operated valves actuated by closing of the limit switch.

It is also an object of the present invention to provide such a run-out table in which the limit switch which starts operation of the control mechanism for the gate is tripped by the trailing ends of the bars or other elongated objects being handled.

Finally, it is an object of the invention to provide a run-out table of the character referred to in which the limit switch is connected to a suitable source of electrical power and is connected, through a junction box, with the solenoids of the double-solenoid valve device, and in which a flexible hose leading from a suitable source of fluid under pressure, such as a compressed air line, through a filter and lubricator with the double-solenoid valves, and the solenoid valves are connected by independent flexible hose lines with flow control valves at opposite ends of the double-acting cylinder which operates the hinged gate.

The above and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawings.

In general terms the invention may be briefly described as comprising an elongated run-out table which may be located so as to receive metal bars or other elongated objects longitudinally and to automatically discharge the same laterally at a predetermined time.

A conveyor, car, truck, handling and storage bolster or the like may be positioned along side of the run-out table so as to receive the bars or other elongated articles as they are discharged therefrom.

The entrance end of the run-out table may be disposed toward a bar mill, with a shear interposed between the mill and the run-out table for cutting bars in suitable lengths to be handled by the table. Or, bars which have been previously rolled and coiled may be run through a straightener and then sheared to desired lengths as they are deposited upon the run-out table.

If desired, the entrance end of the run-out table may be located toward an extrusion die, so that extruded lengths from the die may be fed onto the run-out table. Also, lengths of lumber or other elongated objects may be fed onto the run-out table and handled automatically thereby.

The run-out table comprises generally an elongated, transversely inclined bed or table which may have a flange extending upward from its higher edge and a normally upright gate hingedly connected to its lower edge.

The table may be supported at any desired height above the floor by means of a suitable supporting frame. A double-acting fluid cylinder is pivotally mounted upon the supporting frame beneath the table, preferably at the central portion thereof, and the piston rod of the cylinder is pivotally connected to a bracket rigidly attached to the outer side of the hinged gate.

A flow control valve is connected to each end of the double-acting cylinder. Double-solenoid pilot-operated valves are connected by separate flexible hose lengths with each of the flow control valves. A compressed air line, or other source of fluid pressure, is connected through an air filter and lubricator to the double-solenoid valves.

A limit switch is provided adapted to be actuated when the full length of a bar or other elongated object is received upon the table. The limit switch is electrically connected to a power line or the like and is electrically connected, through a junction box, with the solenoids of the double-solenoid pilot-operated valves.

Each time the full length of a bar or the like is run onto the run-out table the limit switch is tripped thereby, actuating the double-solenoid pilot-operated valves to admit air or other fluid under pressure first to one end of the cylinder to lower the hinged gate, so that the bar or the like will be discharged laterally therefrom by gravity, and then operating the other valve to admit fluid pressure to the other end of the cylinder to raise the gate to normal position.

The cylinder port on the same side as the pilot valve being (or last) energized is open to the inlet port and the other cylinder port is open to exhaust. The operation may be repeated continuously as long as there are any bars or other objects to be run onto the table.

In the accompanying drawings is shown a preferred embodiment of the invention, in which;

FIG. 1. is a perspective view of an automatic tilting run-out table embodying the invention, showing a bar in the act of being run longitudinally onto the table;

FIG. 2 is an elevation of the entrance end of the table, showing the hinged gate in the raised or normal position;

FIG. 3 is a fragmentary perspective view of the improved run-out table showing a bar thereon tripping the limit switch and showing the hinged gate in lowered position for ejecting the bar laterally from the table;

FIG. 4 is a transverse sectional view through the center of the run-out table, looking toward the entrance end thereof, with the hinged gate in raised or normal position, showing the cylinder, the flow valves at opposite ends thereof and the hose connecting the same to the double-solenoid pilot-operated valves and to the filter and lubricator and showing the electrical connections from the junction box to the solenoids; and FIG. 5 is a fragmentary sectional view similar to FIG. 4 showing the hinged gate and the cylinder in tilted position.

Referring now more particularly to the embodiment of the invention illustrated, the apparatues includes the elongated table or bed 1 which may be in the form of a structural channel member of suitable width and length to accommodate the bars or other elongated objects to be handled, with the flanges 2 thereof directed downwardly.

This elongated table is mounted in a transversely inclined position, the angle of inclination thereof being greater than the angle of repose for the bars or other elongated objects to be handled by the table. At the higher edge of the transversely inclined table 1, an upright wall 3 is attached to the adjacent depending flange 2 and extends above the surface of the table.

A gate 4 is hinged, as at 5, to the lower edge of the transversely inclined table and arranged to be normally held in upright position as shown in FIGS. 1, 2 and 4. The table, as shown and above described, is mounted at desired height above the floor by a suitable frame comprising the uprights 6 and 7, the transverse braces 8 and the longitudinal brace members 9. Adjustable feet 10 and 11 may be provided upon the uprights 6 and 7 for adjusting the height of the table 1 to accommodate the apparatus from which the bars or other elongated objects are fed to the table.

The hinged gate 4 is adapted to be operated by means of a fluid cylinder, preferably a pneumatic cylinder, indicated at 12 in FIGS. 4 and 5. This cylinder is pivotally mounted near one end, as indicated at 13, upon a bracket 14 mounted upon a transversely disposed member 15 connected to two of the uprights 6 and 7 midway of the length of the table.

The piston rod 16, of the cylinder 12, is pivotally connected, as at 17, to an extension 18 of a triangular bracket 19 which is fixed to the outer side of the hinged gate 4. The cylinder 12 is a double-acting cylinder, and at each end thereof is connected a flow valve 20. The flow valves are connected, by flexible tubes 21 and 21a, to two ports in a double-solenoid valve device indicated generally at 22, which may be the type of double-solenoid pilot-operated valves sold under the trademark, "Speed King," by Bellows-Valvair Division of International Basic Economy Corporation of Akron, Ohio.

Air under pressure is supplied to the double-solenoid pilot-operated valves by the flexible hose 23 in which is located an air filter and lubricator, indicated at 24, which may also be of a type made by Bellows-Valvair Division of International Basic Economy Corporation. The double-solenoid pilot-operated valves 22 are adapted to be controlled by a limit switch actuated by a bar or the like as the full length thereof is received upon the run-out table.

In the embodiment of the invention illustrated, the limit switch, indicated generally at 25, is located at the entrance end of the table. This may be a double throw, single pole switch of the type made by Allen Bradley Company. The switch is adapted to be operated by a pivoted arm 26. When the arm 26 is in raised position, as shown in FIGS. 1 and 2, the switch 25 is in open position which is the normal position of the switch. Spring means (not shown) within the limit switch normally urges the pivoted arm 26 to raised position.

A cable 27 connects the switch 25 to a suitable source of electric energy, such as power lines or the like, and a cable 28 connects the switch 25 to a junction box 29 from which the cables 30 lead to the solenoids 31 and 31a of the double-solenoid pilot-operated valves 22. When the pivoted arm 26 is depressed to the position shown in FIG. 3, the switch 26 is closed starting the double-solenoid pilot-operated valves into operation.

This double-solenoid pilot-operated valve device is so constructed that it will operate automatically to operate the double-acting cylinder 12 so as to first tilt the hinged gate 4 to lowered position, as shown in FIGS. 3 and 5, and then return the gate to the raised position, as shown in FIGS. 1, 2 and 4.

The operation of the double-solenoid pilot-operated valves 22 is automatic. When the limit switch 25 is closed the solenoid 31 will first be energized opening the valve that admits air through the hose 21 to the outer end of the cylinder 12, driving the piston inward and pulling the gate 4 down to the position shown in FIGS. 3 and 5.

Then the solenoid 31 will be automatically de-energized and the solenoid 31a will be energized, opening the other valve to admit fluid pressure through the hose 21a to the inner end of the cylinder, driving the piston outward and raising the hinged gate 4 to the upper or normal position shown in FIGS. 1, 2 and 4.

It should be understood that the particular type of limit switch and double-solenoid pilot-operated valves are for purpose of illustration and other types of limit switches and solenoid-operated valves may be provided.

For instance, the limit switch may be a double pole, double throw switch, and the solenoid valve device may be such that one solenoid will be energized to open one valve to operate the cylinder 12 to the position shown in FIG. 5 to drop the hinged gate 4.

Then, when the bar, or the like, is discharged laterally from the table, the spring means will cause the pivoted arm 26 to move up to normal position, closing the other pole of the limit switch to energize the other solenoid to open the other valve to operate the cylinder to the position shown in FIG. 4, to raise the hinged gate.

In use, the table as shown in FIG. 1, is placed in front of any apparatus from which elongated articles may be received. For instance, the entrance end of the run-out table may be located toward a bar mill, with a shear interposed between the mill and the run-out table for cutting bars as they come from the mill into suitable lengths to be handled by the table.

At the left side of the table, as viewed in FIG. 1, any device may be located for receiving the bars or the like as they are discharged laterally from the run-out table. Such device may be in the form of a conveyor, a car, a truck, a handling and storage bolster or the like.

Instead of positioning the table in front of a bar mill, it may be positioned in front of a coil of previously rolled bars with a bar straightener and a shear interposed between the coil and the run-out table.

The run-out table may be located in front of an extrusion die for receiving lengths of extruded aluminum or other metal, or it may receive lengths of lumber or other elongated objects longitudinally and discharge them laterally.

As shown in FIG. 1, a bar or the like, indicated at B, is being fed longitudinally onto the table 1. When the bar is sheared to desired length, the trailing end of the bar will drop upon the table depressing the pivoted arm 26 of the limit switch, closing the switch and automatically operating the double-solenoid pilot-operated valves 22, in the manner above described, to lower the gate 4 so that the bar B may roll laterally from the table by gravity, after which the cylinder 12 will be operated to raise the bar to normal position as above described, and the operation may be repeated.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. An automatic tilt table comprising a relatively long narrow table adapted to longitudinally receive longitudinally moving elongated objects thereon, said table being transversely inclined beyond the angle of repose of such elongated objects, a normally upwardly disposed gate hingedly connected to the lower longitudinal edge of said table, means for swinging said gate down to discharge elongated objects one at a time laterally from the table by gravity, and a limit switch located at the entrance end of said table for controlling said means, said switch having a pivoted actuating arm disposed transversely of the table and positioned so as to be operatively depressed by the trailing end portion of an elongated object dropping thereon.

2. An automatic tilt table as defined in claim 1, in which said means then swings said gate upwardly to normal position.

3. An automatic tilt table as defined in claim 1, in which said means includes a double-acting cylinder having a piston rod operatively connected to said hinged gate.

4. An automatic tilt table as defined in claim 3, in which said means includes fluid supply means for the cylinder and double-solenoid pilot-operated valves between the fluid supply and the cylinder.

5. An automatic tilt table as defined in claim 1, in which said limit switch is located below the entrance end of the table at a point spaced from the lower longitudinal edge thereof and the free end of said pivoted actuating arm is disposed toward said gate.

References Cited

UNITED STATES PATENTS

| | | | |
|---|---|---|---|
| 2,086,160 | 7/1937 | Gotthardt et al. | 193—36 |
| 2,763,236 | 9/1956 | Cummings | 214—1 X |
| 3,054,514 | 9/1962 | Riley | 193—36 |

GERALD M. FORLENZA, *Primary Examiner.*

MARVIN A. CHAMPION, *Examiner.*

R. G. SHERIDAN, *Assistant Examiner.*